(No Model.)

H. THOMSON.
FIRE PLUG OR HYDRANT.

No. 515,410.          Patented Feb. 27, 1894.

Witnesses

Inventor:
Hugh Thomson

UNITED STATES PATENT OFFICE.

HUGH THOMSON, OF KEW, NEAR MELBOURNE, VICTORIA.

FIRE PLUG OR HYDRANT.

SPECIFICATION forming part of Letters Patent No. 515,410, dated February 27, 1894.

Application filed March 30, 1893. Serial No. 468,280. (No model.) Patented in England March 30, 1893, No. 6,717.

*To all whom it may concern:*

Be it known that I, HUGH THOMSON, tanner, a subject of the Queen of Great Britain, and a resident of "Thornton," Studley Park Road, Kew, near Melbourne, in the British Colony of Victoria, have invented certain new and useful Improvements in Valves for Fire Plugs or Hydrants and Means for Operating the Same, for which I have obtained Letters Patent in England, dated March 30, 1893, No. 6,717,) of which the following is a specification.

Hitherto it has been usual to construct fire plugs with a loose ball valve which is normally kept closed either by the pressure of water behind it, or else by means of a spring. This serves to prevent the entrance of dirt or sewage into the water main when the valve is on its seat.

The object of this invention is to provide a valve (together with means for operating it) which can be used for fire plugs and hydrants, and which can be opened or closed and retained in position as required. According to this invention the valve is supported upon the end of an arm or lever projecting from a spindle, to which motion is imparted by any convenient mechanism, and preferably by means of a toothed quadrant fitted thereon, and engaging with a suitably arranged worm in such a manner as that when rotated in the required direction it will either open or close said valve, the spindle of said worm being squared or otherwise sided to enable it to be turned by means of a correspondingly shaped handle or lever. The valve is preferably constructed of a solid casting and is fitted with rubber or other packing secured between a washer and the casting forming the main part of the valve.

Figure 1:
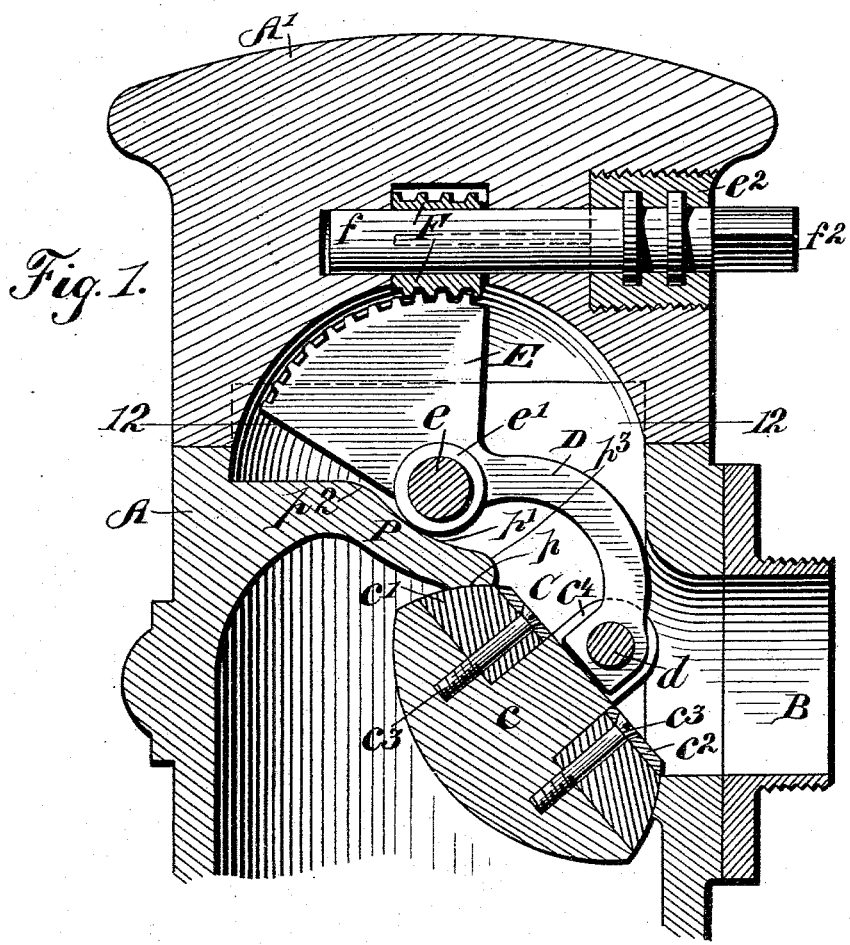
Figure 2:
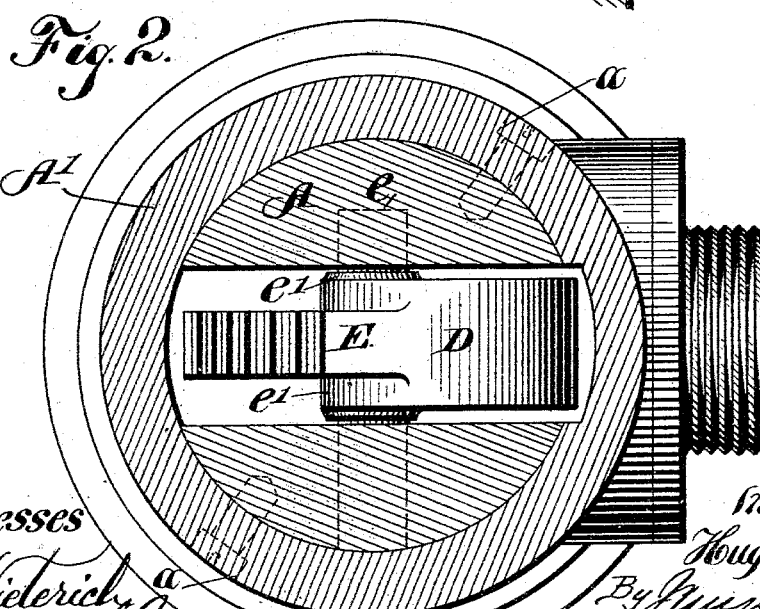

Referring to the accompanying drawings—Figure 1 is a vertical central section, and Fig. 2 a cross section on line 12—12 of Fig. 1 of a portion of a fire plug or the upper end of a stand pipe embodying my invention.

In the above drawings A represents the main casting or casing of the hydrant or fire plug, A' its cap or cover, removably connected with said casing, the parts being preferably connected by means of set screws for the purpose of facilitating the fitting of the valve presently to be described. In the cap A is formed a bearing for a spindle $f$ and a recess for a worm F keyed to said spindle, and an interiorly threaded recess for a two-part nut $e^2$ in the halves of which are formed grooves for the reception of two collars on said spindle, by means of which endwise motion of the latter in its bearings is prevented.

B, is the outlet branch, and $p$ a valve port formed in a suitable partition P in the main casing, said valve port being provided with a valve seat that is inclined toward said outlet branch. A spindle $e$ has bearings in the main casing above the partition just referred to, and has secured thereto a curved radial arm or valve operating lever D having formed thereon a toothed quadrant E that is in perpetual gear with the worm F. The valve C that is adapted to control the port $p$ consists of a casting $c$ that has a central stem whose upper end $c^4$ is forked, and in said fork is pivoted the radial arm or lever D above referred to, and $c'$ is a rubber packing ring fitted on the stem and casting $c$ and secured thereto by a metallic washer $c^2$ and screws $c^3$ by means of which wear of the valve face of the packing can readily be taken up by compressing the said packing ring, the periphery of which is of such configuration as to fit the seat in valve port $p$ and to be held thereto fluid tight, the said packing ring being substantially a section of a sphere.

It has been stated above that the quadrant E is in perpetual gear with the worm F on spindle $f$, this is absolutely necessary, otherwise the valve might become inoperative, should said quadrant be turned sufficiently in one or the other direction to move out of gear with said worm. This is however, not possible with the arrangement shown in Fig. 1. The partition P as shown, has a depression $p'$ in its upper face above which lies the spindle $e$ so that the periphery of the bearing $e'$ of the quadrant E through which said spindle passes will be practically in contact with the face of said depression $p'$ at the point of its greatest depth, an abutment $p^2$ being thus formed that limits the movement of the quadrant from right to left. The movement of said quadrant in a reverse direction is limited by the contact of the curved radial arm or lever D with the upper face of the partition P at the right of the depression $p'$ or at the point $p^3$, the length and curvature of said arm D being such as to move the valve C clear of its seat and of the valve port from right to left, while the toothed arc or face of the quadrant is sufficiently great to admit of the partial rotation of the latter from point $p^3$ to point $p^2$ and vice versa, without moving out of gear with the worm F.

The advantages of the operative devices above described will be readily understood by those conversant with this branch of the arts, and I may here simply state that the main object in constructing the valve C with a heavy metallic body $c$, and arranging the valve operating lever above the valve port, is to facilitate the motion of the valve from its seat, which is necessary in case of fire.

Having thus described my invention, what I claim as new therein, and desire to secure by Letters Patent, is—

1. The combination with a fire plug or hydrant provided with a partition having a valve port with a valve seat inclined toward the outlet port, said partition interposed between said outlet and the inlet port; of a valve comprising a solid casting, as C, formed with an annular shoulder and with lugs projecting from its outer face, a packing, as $c'$, a retaining ring, as $c^2$, and suitable set screws for securing the packing to said shoulder, said packing having an inclined seat face fitting the corresponding seat in the valve port, a revoluble spindle having its bearings in the fire plug casing, and a radial arm fast on said spindle and pivotally connected to the lugs of the valve, for the purpose set forth.

2. The combination with the casing provided with an outlet branch and a valve port provided with a valve seat inclined toward said outlet branch, said valve port formed in a partition provided with a curvilinear depression $p'$ in its upper face whereby abutments $p^2$ and $p^3$ are formed; of a spindle revoluble in said casing above said depression, a quadrant and a curved valve lever on said spindle, and a valve for controlling the aforesaid valve port, pivotally connected with the lever, for the purpose set forth.

In witness whereof I have hereunto set my hand in presence of two witnesses.

HUGH THOMSON.

Witnesses:
WALTER SMYTHE BAYSTON,
EDWIN WILSON.